March 18, 1924. 1,487,054
R. O. FERGUSON
PROTECTOR FOR OIL COCKS
Filed Nov. 20. 1922
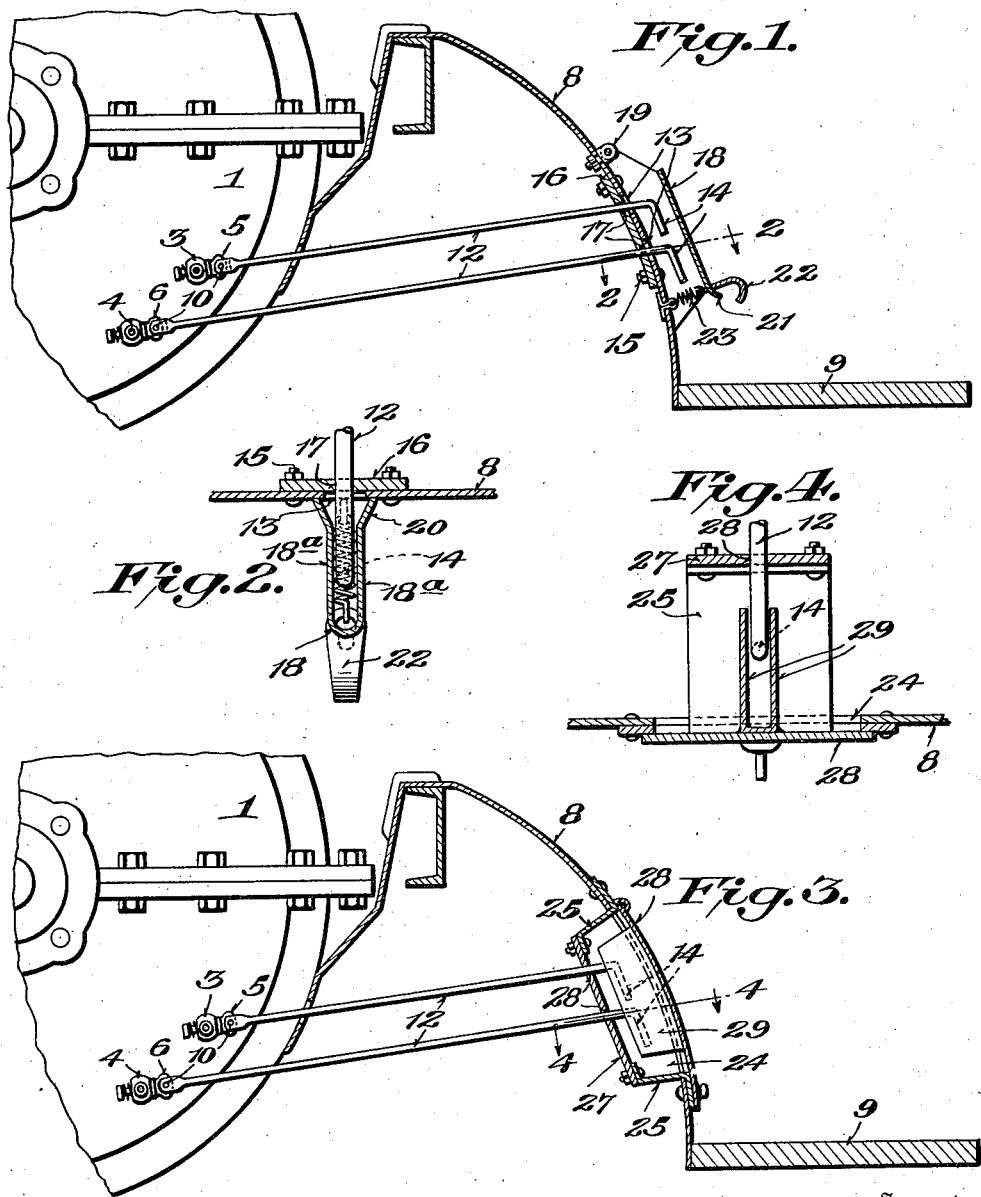
Inventor
R. O. Ferguson,
By
C. A. Mason, Attorney Patented Mar. 18, 1924.

1,487,054

UNITED STATES PATENT OFFICE.

ROBERT O. FERGUSON, OF BRISTOL, TENNESSEE.

PROTECTOR FOR OIL COCKS.

Application filed November 20, 1922. Serial No. 602,198.

*To all whom it may concern:*

Be it known that I, ROBERT O. FERGUSON, a citizen of the United States of America, residing at Bristol, in the county of Sullivan and State of Tennessee, have invented a certain new and useful Protector for Oil Cocks, of which the following is a full, clear, and exact description.

This invention relates to attachments to automobiles, and more particularly to means for protecting and locking the operating means for the pet cocks which are ordinarily attached to the crank case of Ford automobiles.

An important feature of the invention comprises means for enclosing and holding against accidental movement the extreme ends of the rods which are attached to the pet cocks, and whereby said pet cocks are operated.

In the preferred form of the invention, this means is exemplified by a cover which is hinged to the fender plate extending from the running board of the machine, and encloses the outer ends of the operating rods and holds said rods in the position which they assume when the pet cocks are closed. Such device, accordingly, prevents any accidental opening of the pet cocks as the result of the vibrations of the car.

Another feature of the invention is comprised in a fibre, or other equivalent form of washer, which is secured to the face of the splash plate over the openings through which the pet cock operating rods extend, said washer being provided with openings to receive the rods. The washer not only acts as a very efficient bearing for the rods, but obviates rattles and squeaks which would otherwise occur, due to the vibrations of the car.

The above and other important features of the invention, including details of construction and combinations of parts will be more clearly apparent from the following description in connection with the accompanying drawings which illustrate certain forms of the invention.

In the drawings:

Fig. 1 is a view illustrating a part of a Ford crank case with the invention applied;

Fig. 2 is a sectional view on the line 2—2, Fig. 2;

Fig. 3 illustrates a modification of the invention; and

Fig. 4 is a sectional view on the line 4—4, Fig. 3.

The numeral 1 indicates the crank case of the engine of a Ford car having at the front end thereof two pet cocks 3, 4, which are located at different elevations and are used for determining the amount of oil in the crank case, as is well known. Heretofore, these pet cocks have been frequently operated by reaching under the fender of the car and manipulating the handles 5, 6, thereof. This operation was attended by considerable inconvenience and annoyance and resulted in the operator soiling his hands and clothes so that he would frequently neglect to perform this necessary operation with the result that the bearings would be burnt out.

In order to overcome the above objection, it has been proposed to provide extension rods which are secured to the handles of the pet cocks, and extend outwardly through the fender plate. An objection to some of these prior devices has been that the devices at the outer ends of these extension rods whereby they were manipulated were not protected against accidental operation. Hence, frequently, these rods would be jarred or turned so as to open the pet cocks while the car was running with the result that the oil in the crank case would be discharged therefrom, and the bearings of the machine would become burnt out.

Connected with each of the handles, 5, 6, of the pet cocks by a loose pivot connection, as 10, is an extension rod 12, having at its outer extremity a bent portion or handle 14. The fender plate or splash board 8 of the machine which extends upwardly from the usual running board 9, is provided with two fairly good sized openings 13, 13, through which extend the rods 12, 12, and on the inside of the plate 8 is fastened by bolts 15, or other suitable means, a washer 16 preferably composed of wood fibre, or equivalent material. The fibre washer 16 is perforated at 17 to provide for the passage of the rods 12, it being noted that the perforations 17 are just sufficiently large to permit the rod to pass through easily, while the openings 13 which overlie the openings 17 are considerably larger than the latter.

A cover 18, which is formed with two parallel side 18ª, 18ª, encloses a space which is slightly wider than the thickness of the bent ends 14 of the extension rods, said cover being connected by a hinge 19 to the fender plate 8. The cover is preferably slightly flared at its base portion, as indicated by the numeral 20, and fits snugly against the outer curved surface of the fender plate. The outer forward portion of the cover 18 is preferably provided with a slightly upturned projection 21, and a catch 22, which is connected by a spiral spring 23 with the fender plate, is adapted to be sprung over the projection 21 to yieldingly maintain the cover in closed position over the bent ends or handle portions 14 of the extension rods 12. By this construction, it will be seen that the cover, when in closed position, will firmly and reliably maintain the pet cocks closed, for it is only when the cover is in this position that the two bent ends 14 of the extension rods are arranged in vertical alignment, which is the position that said ends occupy when the pet cocks are closed. When the cover is placed over the handles of the extension rods, it will be impossible for the rods to be turned so as to open either of the pet cocks, and said rods are accordingly locked and are maintained against accidental opening, due to the vibrations of the car, or any other cause.

It will also be seen that if either of the bent ends 14 is turned to open a pet cock the cover 18 cannot be closed, which ensures the closing of both pet cocks, before the cover can be closed, as when the cover is resting on one of the bent ends it will indicate that a pet cock has been left open. This is an important feature of the invention.

The fibre washer 16 not only acts as a packing for the extension rods, but serves to eliminate all noises due to the scraping of the rods against the edges of the openings 13, which would otherwise occur.

In addition to the foregoing advantages of the construction described, it will be noted that the handles 14 extend a slight distance outwardly beyond the fender plate, thus providing sufficient clearance to permit relative movement of the plate and crank case, due to the movement of said plate relative to the crank case when persons step on and off of the running boards, and also resulting from the ordinary vibrations of the car when in motion. The yielding connection between the cover and the fender plate due to the spring catch 22 also permits considerable lost motion between these parts without throwing unnecessary strain upon any of them.

In the construction shown in Figs. 3 and 4, a slight departure is made from that illustrated in Figs. 1 and 2, and at the same time the principle of the invention is preserved. Under this modification a large opening 24 which is preferably rectangular in shape, is made in the fender plate, and within this opening two inwardly extending strips of metal 25, extend, forming a depression, the bottom of which is formed by a fibre washer 27, having openings 28, through which the extension rods 12 pass. The outwardly bent ends 14 of these rods are housed in the depression or space formed by the parts 25, 27, and a hinged lid 28 covers the depression. The lid 28 is provided with two inwardly extending side members 29, which enclose the bent ends 14 of the extension rods and act precisely the same in their locking effect upon the pet cocks as the cover 18, in the form shown in Figs. 1 and 2.

The right is reserved to make any changes in the details of construction, or in the relative arrangement of the parts described which fall within the spirit of the invention, provided such changes are comprehended by the terms of the following claims.

Having thus described my invention, what I claim as new and desire to secure by U. S. Letters Patent is;

1. In a device of the class described, the combination of a pet cock, a rod connected to said cock, and arranged to extend through an opening in the fender plate, said rod having means at its outer end for manipulation, and a cover enclosing said means and arranged to hold the cock in locked position.

2. In a device of the class described, the combination of a pet cock, a rod extending therefrom through an opening in the fender plate, and a cover hinged to said plate and arranged to enclose and lock the outer end of said rod.

3. In a device of the class described, the combination of a pet cock, a rod extending therefrom and provided at its outer extremity with a bent portion for manipulation, a fender plate provided with an aperture through which said rod extends, and a locking device pivoted to said plate and constructed to enclose the bent end of the rod and to hold it in position for maintaining the pet cock closed.

4. In a device of the class described, the combination with a crank case, pet cocks therein, a fender plate provided with apertures, rods extending from said pet cocks through said apertures and provided with bent outer ends, and a locking cover pivoted to said plate, and constructed and arranged to enclose the bent ends, and to maintain them in alignment so as to hold the pet cocks closed.

5. In a device of the class described, the combination with a fender plate provided with an aperture, a pet cock having a rod extending through said aperture, a fibre washer placed over the aperture and having an opening registering with the opening in said plate, said rod extending through said apertures, and a locking cover hinged to said plate and arranged to enclose and lock the outer end of said rod.

6. In a device of the class described, the combination with a pet cock, of a fender plate provided with an aperture, a rod extending from said cock and passing through said aperture, said rod having its outer extremity bent and spaced from the outer face of said plate, and a cover hinged to the plate and arranged to enclose the bent end of the rod and hold the same in position to maintain the pet cock closed.

7. In a device of the class described, the combination with a pet cock, of a fender plate provided with an aperture, a rod extending from said cock through said aperture and having a bent end at its extremity, a locking cover for the bent end of the rod hinged to said plate and a yielding catch for securing said cover in closed position.

In testimony whereof I have hereunto set my hand this 18th day of November A. D. 1922.

ROBERT O. FERGUSON.